United States Patent [19]

Abe et al.

[11] Patent Number: 4,643,984

[45] Date of Patent: Feb. 17, 1987

[54] PROCESS FOR PRODUCING A COMPOSITION WHICH INCLUDES PEROVSKITE COMPOUNDS

[75] Inventors: Kazunobu Abe, Izumi; Masashi Aoki, Takatsuki; Hiroaki Rikimaru, Sangocho; Takeshi Ito, Sakai; Kazuhisa Hidaka, Takaishi; Kayoko Segawa, Ikoma, all of Japan

[73] Assignee: Sakai Chemical Industry Co., Ltd., Osaka, Japan

[21] Appl. No.: 758,072

[22] Filed: Jul. 23, 1985

[30] Foreign Application Priority Data

Jul. 25, 1984 [JP] Japan .................. 59-154289

[51] Int. Cl.$^4$ .................. C01G 23/00; C04B 35/46
[52] U.S. Cl. .................. 501/134; 252/62.9; 423/593; 423/598; 501/135; 501/136; 501/137; 501/138; 501/139
[58] Field of Search ............ 423/593, 598; 501/134, 501/135, 136, 137, 138, 139, 1

[56] References Cited

U.S. PATENT DOCUMENTS

| | | | |
|---|---|---|---|
| 3,413,083 | 11/1968 | Daendliker | 423/598 |
| 3,647,364 | 3/1972 | Mazdiyasni et al. | 423/598 |
| 3,983,077 | 9/1976 | Fuller et al. | 501/137 |
| 4,537,865 | 8/1985 | Okabe et al. | 501/137 |
| 4,543,341 | 9/1985 | Barringer et al. | 501/135 |

OTHER PUBLICATIONS

Smith, J. S. et al. "Preparation and Characteristization of Alkoxy-Derived SrZrO$_3$ and SrTiO$_3$"—J. Am. Cer. Soc. 53(2), pp. 91–95, 1970.

Primary Examiner—Helen M. McCarthy
Attorney, Agent, or Firm—Wenderoth, Lind & Ponack

[57] ABSTRACT

A process for producing a composition which includes a perovskite compound, the process comprising:

(a) subjecting a mixture of a hydroxide of at least one A group element selected from the group consisting of Mg, Ca, Sr, Ba, Pb and rare earth elements and a hydroxide of at least one B group element selected from the group consisting of Ti, Zr, Hf and Sn, to the hydrothermal reaction in an aqueous reaction medium;

(b) adding an insolubilizing agent to the resultant reaction mixture to insolubilize water-soluble compounds of the unreacted A group element dissolved in the aqueous medium so as to adjust the ratio of the group A element to the group B element in a resulting composition to a desired A/B ratio; or (c) filtering, washing with water and drying the resultant reaction mixture to provide a solid reaction product, dispersing the reaction product in an aqueous medium to form a slurry, adding to the slurry a water-soluble compound of the A group element, and then adding to the siurry an insolubilizing agent to insolubilize the water-soluble compound of the A group element so as to adjust the ratio of the group A element to the group B element in a resulting composition to a desired A/B ratio; and (d) filtering, washing and drying the resultant mixture to provide the composition which includes the perovskite compound having the desired A/B ratio.

6 Claims, 11 Drawing Figures

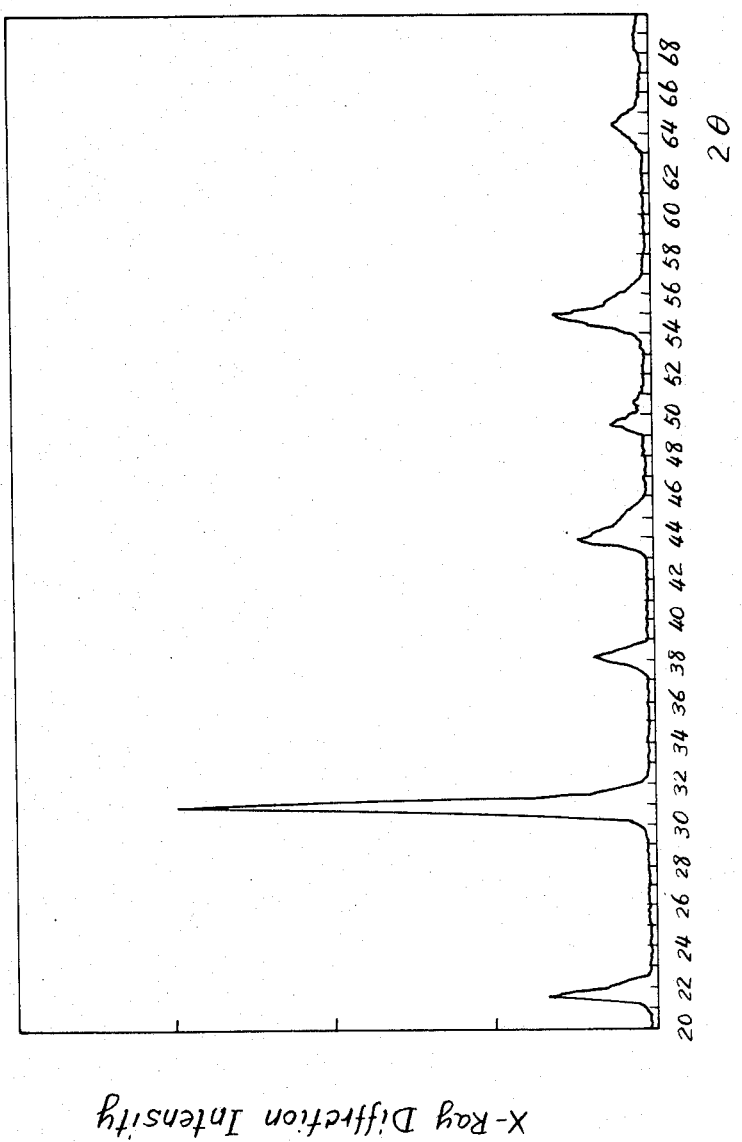

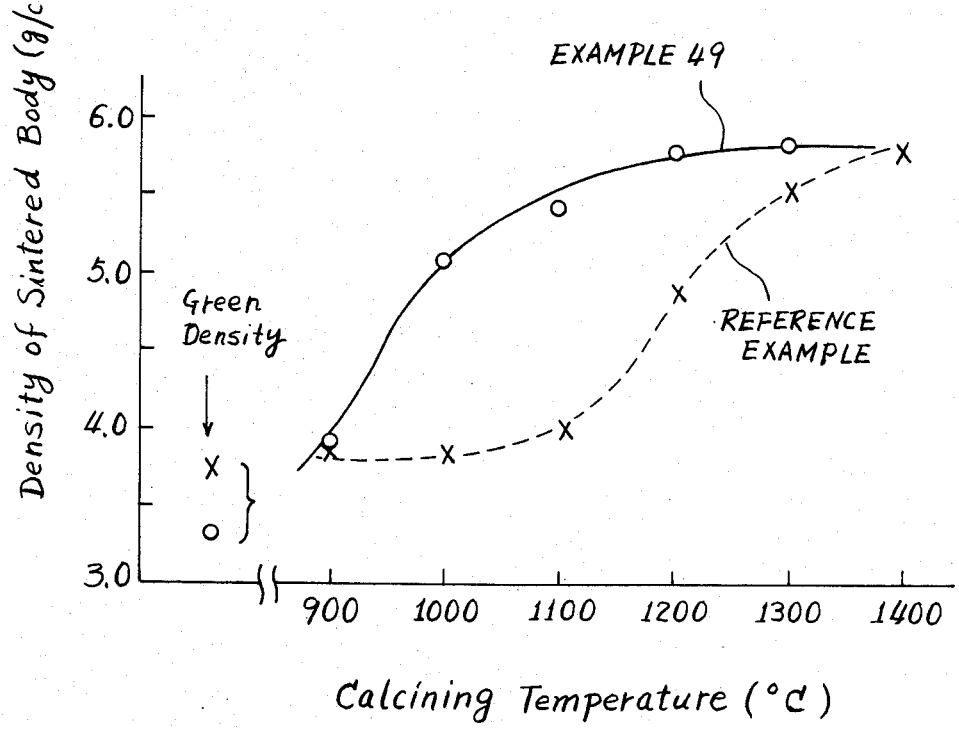

PROCESS FOR PRODUCING A COMPOSITION WHICH INCLUDES PEROVSKITE COMPOUNDS

The present invention relates to a process for producing a composition which includes perovskite compounds and a process for producing a sintered body suitable for use as a dielectric ceramic capacitor by molding and sintering the composition.

The perovskite compound is a compound which has a crystal structure similar to the calcium titanate or perovskite, and provides a ferroelectric ceramic body having excellent dielectricity, piezoelectricity and semiconductivity by molding and sintering. This ceramic dielectric is in a wide use in communication instruments, computers and other electronic machineries as capacitors, wave filters, lighting elements, thermistors, etc.

In recent years electronic devices have become much smaller in size and higher in performance than before. This is also the case in ferroelectric ceramics produced from the perovskite compound, and intensive investigations have been made to improve the process for producing the dielectric ceramic, such as molding and sintering methods. However, it seems necessary to improve the properties of particles of the perovskite compound as a raw material as well as the process for producing the ceramic dielectric for the production of further superior ceramic dielectrics.

Such being the case, a demand for the perovskite compound particles of globular form, uniform in diameter and of less than 1 $\mu$m, more preferably less than 0.5 $\mu$m, in particle size is notably increasing. Such particles will have a large surface energy because of their small particle size, and a superior packing at molding because of uniform sphericity to greatly improve the sinterability, and as a result the particles will be more feasibly and highly sintered at lower temperatures, to provide a sintered body composed of grains of from about 0.5 $\mu$m to about 1 $\mu$m, and having the most high dielectric constant among the ferroelectric substances.

The perovskite compound is produced usually by mixing a carbonate or an oxide of at least one element selected from the group consisting of Mg, Ca, Sr, Ba and Pb, these elements being hereinafter referred to as A group elements, with an oxide of at least one element selected from the group consisting of Ti, Zr, Hf and Sn, these elements being hereinafter referred to as B group elements, calcining the mixture at temperatures not less than about 1000° C., wet-pulverizing, filtering and then drying the product. According to this method, however, the perovskite compound generated by the calcination aggregates to cakes which are difficult to pulverize to fine particles smaller than about 1 $\mu$m in size even by wet-pulverizing with the use of a trommel, and further, the particles are irregular in form. Therefore, the particle of the conventional perovskite compound thus obtained is inferior in the sinterability, and it must usually be sintered at temperatures of about 1400° C. or higher to produce ceramic capacitors having sufficient dielectric properties suitable for practical use, but also the particle grows to large grains from about 5 $\mu$m to 10 $\mu$m in size in the sintering. This grain size is very far from the optimum grain size which is from about 0.5 $\mu$m to 1 $\mu$m, as is mentioned hereinbefore.

The above results in a variety of disadvantages. For example, the production of multilayer capacitors now in widely used needs high temperature melting and hence expensive noble metals, e.g., Pd, as an internal electrode material, and therefore the production cost is expensive.

It has already been reported by K. Kubo et al. (Kogyo Kagaku Zasshi, 71, pp. 114–118 (1968)) that the hydrothermal reaction of a mixture of barium hydroxide and titanium hydroxide, followed by filtration, washing with water, adding an acid to the reaction mixture, washing with water, and then drying, provides fine particles of the perovskite compound. However, according to this method, the reaction is not completed, and as a result, the reaction mixture involves unreacted barium compounds which are soluble in water while unreacted titanium compounds remain as water-insoluble solids in the reaction mixture. Therefore, when the reaction mixture is washed with water after the reaction, the water-soluble barium compound is removed therefrom, and the resultant barium titanate is accompanied by titanium in amounts more than the stoichiometric amount in the perovskite compound, or by barium in amounts less than the stoichiometric amount. Thus such a perovskite compound, after being sintered, fails to provide a sintered body in which the Ba/Ti ratio is strictly 1.00. Furthermore, since the conversion rate of the mixture of the hydroxides to barium titanate is varied at every reaction, it is difficult to control the Ba/Ti ratio of the barium titanate obtained, and accordingly the barium titanate by the conventional hydrothermal reaction is unsuitable for use in the production of ceramic dielectrics.

The present inventors therefore have made an intensive investigation on the hydrothermal process for producing the perovskite compound in a wide range, and found out that irrespective of the individual A and B elements involved in the reactants, i.e., a mixture of the hydroxides, the all or parts of the unreacted A group element compound remain and is dissolved in water, while the unreacted B group element compound remains as solids in the reaction mixture after the hydrothermal reaction. Therefore, when the reaction mixture, after the hydrothermal reaction, is filtered and washed with water, the water-soluble A group element compound is removed from the reaction product so that the resultant product includes the B group element in excess. The control of the excess amount of the B group element in the reaction product has been also found difficult. In turn, even by the hydrothermal reaction of the A group element hydroxide with the B group element hydroxide in an A/B ratio of more than 1 at elevated temperature, it has been found that the B group element remains unreacted.

And after a further intensive study on the hydrothermal process, the inventors have found out that the fixing of the A group element as a water-insoluble compound in the reaction mixture after the hydrothermal reaction of the hydroxides of the A and B group elements with the predetermined A/B ratio, followed by filtration, washing with water and drying, provides a composition composed of fine and uniform spherical particles, including the perovskite compound, and having a strictly controlled A/B ratio, and the composition thus obtained therefore is sintered to ceramic dielectrics with more improved electric properties at lower temperature than the conventional perovskite compound particles.

Therefore, an object of the present invention is to provide a novel process for producing a composition which includes a perovskite compound and has a predetermined controlled A/B ratio, and is accordingly suitable for use in the production of a sintering body as a ceramic dielectric.

The process for producing a composition which includes a perovskite compound, the process comprising:

(a) subjecting a mixture of a hydroxide of at least one A group element selected from the group consisting of Mg, Ca, Sr, Ba, Pb and rare earth elements and a hydroxide of at least one B group element selected from the group consisting of Ti, Zr, Hf and Sn, to the hydrothermal reaction in an aqueous reaction medium;

(b) adding an insolubilizing agent to the resultant reaction mixture to insolubilize water-soluble compounds of the unreacted A group element dissolved in the aqueous medium so as to adjust the ratio of the group A element to the group B element in a resulting composition to a desired A/B ratio; or (c) filtering, washing with water and drying the resultant reaction mixture to provide a solid reaction product, dispersing the reaction product in an aqueous medium to form a slurry, adding to the slurry a water-soluble compound of the A group element, and then adding to the slurry an insolubilizing agent to insolubilize the water-souble compound of the A group element so as to adjust the ratio of the group A element to the group B element in a resulting composition to a desired A/B ratio; and (d) filtering, washing and drying the resultant mixture to provide the composition which includes the perovskite compound having the desired A/B ratio.

The composition of the invention is an intimate mixture of a perovskite compound formed and water-insoluble solid compounds of the unreacted B group element as well as water-insoluble soild compounds of the A group element. Further the composition is substantially composed of the perovskite compound formed and has a strictly controlled A/B ratio. The water-insoluble compound of the unreacted A group element in the composition is preferably generated by the reaction of the water-soluble compounds of the unreacted A group element in the reaction mixture after the hydrothermal reaction with the insolubilizing agent.

The water-insoluble compound of the A group element in the composition, as an alternative, may be formed by filtering the reaction mixture and washing with water to provide a solid reaction product, and dispersing the solid reaction product in an aqueous medium to form a slurry, adding to the slurry a water-soluble compound of the A group element. The amount of water-soluble compound of the A group element added to the reaction mixture or the reaction product is determined based on the A/B ratio therein so that the resultant composition has a desired A/B ratio. As a further alternative, the water-insoluble compound of the A group element may be directly added to a slurry of the reaction product of the hydrothermal reaction, followed by mixing together, filtering and drying, to provide a composition of a desired A/B ratio.

The composition thus formed, after being sintered, provides a sintered body which is substantially composed of the perovskite compound of any A/B ratio desired.

The other objects and features of the invention will be more apparent with reference to the following description and drawings, in which:

FIGS. 2 to 10 are X-ray diffraction diagrams of compositions produced by the process of the invention; and FIG. 11 is a graph illustrating the relationship between the sintering temperature and the density of sintered bodies from barium titanates produced by the conventional calcining process and by the process of the invention, respectively.

Figure 1:
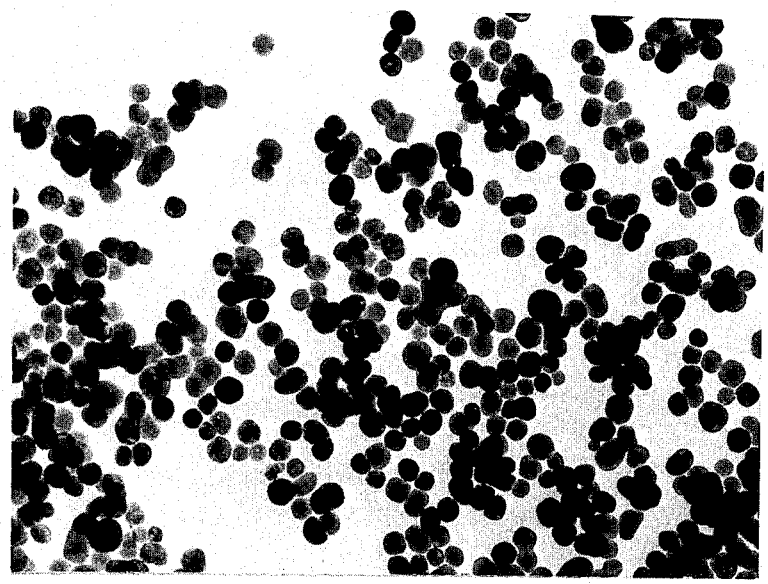
FIG. 1 is a TEM photography (50000 magnifications) of a composition produced by the process of the invention.

The mixture of a hydroxide of at least one A group element which is selected from the group consisting of Mg, Ca, Sr, Ba, Pb and rare earth elements and a hydroxide of at least one B group element which is selected from the group consisting of Ti, Zr, Hf and Sn is obtainable in various methods. Preferred rare earth metals are, for example, Nd and Y.

Some examples of the preparation of the mixture of hydroxides are described.

(1) A hydroxide of the A group element and a hydroxide of the B group element are prepared respectively, and then the hydroxides are mixed together. For example, commercially available hydroxides of the A and B group elements may be mixed together. In the preparation of the hydroxide, the reaction of a salt including the element with an alkali, or the reaction of an alkoxide including the element with water may be employed.

(2) A mixture of a salt including the A group elment and a salt including the B group element is reacted with an alkali.

(3) A hydroxide including the A group element is reacted with a salt including the B group element.

(4) A hydroxide including the A group element is reacted with an alkoxide including the B group element.

(5) An alkoxide including the A group element is reacted with a hydroxide including the B group element.

(6) A mixture of an alkoxide including the A group element and an alkoxide including the B group element is reacted with water.

Depending upon manners and conditions in which the mixture of hydroxides is prepared, the resultant mixture may contain in parts a perovskite compound, or its precursor which is on the way to a completely crystallized perovskite compound. Therefore, the mixture of hydroxides may contain in parts a perovskite compound or its presursor in the invention.

According to the invention, the mixture of hydroxides is subjected to the hydrothermal reaction. The hydrothermal reaction is already well-known, and in the process of the invention, the mixture of hydroxides is heated under alkaline conditions in an aqueous medium. Since the mixture of hydroxides per se alkaline, it is not necessary to add an alkali to the mixture, however, an alkali may be added to the mixture when desired.

According to the invention, the mixture of the hydroxides is heated preferably to temperatures ranging from about 100° C. to temperatures less than the critical temperatures of the reaction medium used. Most preferably the hydrothermal reaction temperature is about 120°–300° C. However, the reaction temperature is not specifically limited to the above range in the invention, since the mixture of hydroxides may provide a perovskite compound at lower temperatures depending on the A and B group elements involved therein. Furthermore, it is sometimes advantageous to subject the mixture to the hydrothermal reaction at lower temperatures so as to control the particle size of the resulting perovskite compound. Accordingly, for example, the mixture of hydroxides may be at an initial stage reacted at lower temperatures than about 100° C., e.g., from about 50°-90° C., and then at temperatures of about 100° C. or higher.

However, it is a general tendency that when the hydrothermal reaction temperature is less than about 100° C., the reaction of the hydroxides proceeds so insufficiently as to fail to provide the perovskite compound in high yields. The higher the reaction temperature, the greater the reaction rate to form the perovskite compound, however, the higher the reaction temperature is, the more expensive the reaction vessel needed, and the greater the energy cost required.

When necessary, the degree of alkalinity, that is, the degree of excess of alkali or the concentration in the aqueous medium is adjusted. In general, the greater the excess of the amount of alkali, the smaller the particle size of the resultant perovskite compound. Also the greater the concentration of the hydroxide, the smaller the particle size of the perovskite compound obtained. Therefore, the particle size of the perovskite compound obtained is controllable by the alkalinity and/or the concentration of the hydroxides in the hydrothermal reaction.

In the reaction mixture thus formed by the above hydrothermal reaction, the perovskite compound and compounds of the unreacted B group element are involved as water-insoluble solid, whereas compounds of the unreacted A group element are involved as water-soluble components in the aqueous medium. Then according to the invention, an insolubilizing agent is added to the reaction mixture after the hydrothermal reaction to insolubilize the water-soluble compounds of the unreacted A group element so as to produce a composition which has a desired A/B ratio and includes the perovskite compound formed. More specifically, the composition of the invention is an intimate mixture composed of the perovskite compound formed together with water-insoluble solid compounds of the unreacted B group element and water-insoluble solid compounds of the unreacted A group element generated by the reaction of water-soluble compounds of the unreacted A group element with the insolubilizing agent in the reaction mixture after the hydrothermal reaction.

The insolubilizing agent is usually added to the reaction mixture after the hydrothermal reaction to insolubilize or fix as solids the water-soluble compound of the unreacted A group element therein. The amount of the unreacted A group element in the reaction mixture may be determined by sampling a small portion of the reaction mixture, and then by washing the sample with water, filtering the solids from the sample, and analyzing the amounts of the A and B group elements therein, respectively.

To clarify the terms used herein, the reaction mixture is defined as a mixture of a perovskite compound formed and water-insoluble compounds of unreacted B group element as well as water-soluble compounds of unreacted A group element in the aqueous medium used in the hydrothermal reaction, and the reaction product is defined as a solid mixture of a perovskite compound formed and water-insoluble compounds of unreacted B group element after having removed water-soluble compounds of the unreacted A group element.

Thus, according to the invention, as another process for producing the composition of a desired A/B ratio, the whole of the reaction mixture after the hydrothermal reaction is washed with water, filtered, and the thus obtained reaction product is analyzed to find the amounts of the A and B group elements. The reaction product is made to an aqueous slurry again, and then a water-soluble compound of the A group element is added to the slurry in amounts to supplement the A group element to adjust the A/B ratio of the resulting composition to a desired value. The insolubilizing agent is then added to the slurry to convert the water-soluble compound of the A group element to water-insoluble ones.

Further according to the invention, a water-insoluble compound of the A group element may be directly added to the reaction product to supplement the A group element to adjust the A/B ratio of the resulting composition to a desired value.

More specifically, the composition with A/B ratio of 1.00 is obtained by either of the below procedures.

(1) A mixture of hydroxides with an A/B ratio of 1.00 is prepared, subjected to the hydrothermal reaction, and after the reaction the insolubilizing agent is added to insolubilize the water-soluble compounds of the unreacted A group element in the reaction mixture, followed by filtering and washing with water.

As the insolubilizing agent is usable any compound to form precipitates which have small solubilities to water sufficient to insolubilize the water-soluble compounds of the unreacted A group element in the reaction mixture after the hydrothermal reaction.

In the case where the insolubilizing or fixing of the water-soluble compounds of the unreacted A group element is not completed by the addition of the insolubilizing agent, for example, where the solubility of the reaction product of the water-soluble compounds of the unreacted A group element with the insolubilizing agent is not sufficiently large to permit that the all the water-soluble compounds of the unreacted A group element to precipitate, then it is of use that the A/B ratio in the hydroxide mixture is so adjusted that the insolubilizing is completed.

As an alternative, after the hydrothermal reaction of the mixture of hydroxides, the reaction mixture is filtered and then washed with water to remove the water-soluble compounds of the unreacted A group element. Then the obtained solid reaction product is analyzed to find the A/B ratio therein. Based on the A/B ratio thus found, the amount of the A group element necessary to make the A/B ratio of the resulting composition to be 1.00 is calculated, and a water-soluble compound of the A group element is mixed with the reaction product, followed by insolubilizing the compound of the A group element. As a further alternative, a water-insoluble compound of the A group element is added to a slurry of the reaction product so as to adjust the A/B ratio of the resulting composition to 1.00.

(2) A mixture of hydroxides with the A/B ratio more than 1.00 is prepared, subjected to the hydrothermal reaction, and after the reaction the insolubilizing agent is added to insolubilize parts of the water-soluble compounds of the unreacted A group element in the reaction mixture so that the resulting composition has a A/B ratio of 1.00, followed by filtering and washing with water the mixture, to provide the composition of an A/B ratio of 1.00.

The composition with the A/B ratio either more or less than 1.00 is also obtainable by procedures similar to the above, as will be readily understood.

The insolubilizing agent is now described. As the insolubilizing agent to form water-insoluble solid compounds of the A group element which are readily decomposed by sintering so as not to remain in a resulting sintered body of the composition, there is mentioned, for example, carbon dioxide, a carbonate of alkali metals, alkaline earth metals and ammonium such as sodium carbonate and ammonium carbonate, an alkali metal salt of an organic carboxylic acid such as lauric acid, myristic acid, palmitic acid and stearic acid, an organic polybasic carboxylic acid such as oxalic acid, ketomalonic acid, tartaric acid, maleic acid, malonic acid and succinic acid, an alkali metal salt of these polybasic carboxylic acids, cation exchange resins such as Amberlite IRC-50 (methacrylic acid resins), Dekation H-70 (carboxylic acid resins), Duolite CS-100 (phenol-carboxylic acid resins), and Duolite CS-101 (acrylic acid resins).

As the insolubilizing agent to form water-insoluble solid compounds of the A group element which remain in a resulting sintered body of the composition, but impart no undesired properties to the sintered body, there is mentioned, for example, silica such as Zeolite and inorganic ion exchange resins.

After the fixing of the A group element as above, the reaction mixture or the reaction product is filtered, washed with water and dried usually at temperatures of about 100°-200° C. in a usual manner to provide the composition which has any desired A/B ratio.

According to the process of the invention, the composition can be obtained which is in the form of uniform and spherical particles of desired particle size of about from about 0.01 μm to 1.0 μm and has a strictly controlled A/B ratio. Further since the composition is substantially composed of perovskite compound, the particle size of the perovskite compound formed is nearly the same as that of the composition. This is greatly advantageous over the convetional perovskite compound particles. For example, the perovskite compound having a A/B ratio of 1.00 is preferably used for the production of highly dielectric capacitor, and the present process readily provides a composition which has an A/B ratio strictly adjusted to 1.00, and therefore the composition, after being sintered, forms a ceramic dielectric of the A/B ratio of strictly 1.00.

Further the composition including the perovskite compound according to the invention is readily sinterable. In particular, the composition is sinterable at as low a temperature as from about 1100° C. to about 1300° C. to provide a highly sintered body which has superior dielectric properties. Therefore, for example, the use of the composition of the invention makes it possible to use lower melting point metals as an internal electrode in multilayer capacitors, and hence to lower the production cost of such capacitors.

In general, particles have a superior sinterability when they have a superior packing and a small particle size, i.e., a large surface energy. However, the smaller the particles are, the more voluminous they are, and accordingly the particles of a very small particle size are not always easy to be highly sintered. Contrary to this, the composition of the invention has substantially the same packing as the conventional perovskite compound particles by the calcining process, but also a more excellent sinterability, nevertheless the composition of the invention contains small perovskite compound particles of about one tenth as large as the particle size of the perovskite compound particles by the calcining method. This fact illustrates that the perovskite compound included in the composition of the invention is spherical and uniform in diameter as well as has a superior dispersibility.

In the sintering of the perovskite compound, in general, additives, such as compounds of B, Bi, alkaline earth metals, for example, Li, Na and K, rare earth metals, for example, Y, Dy, Ce and Sm, transition metals, for example, Fe, Mn, Co, Ni and Nb, and further Si or Al, are added to the perovskite cmpound particles to improve the sinterability of the compound and electric properties of the sintered body obtained from the compound. The composition of the invention may also contain such an additive, and the additive may added at any stage to the feed materials or the reaction product. That is, the additive may be added at the stage of preparing the hydroxide mixture, at the hydrothermal reaction of the mixture, or at the stage of fixing or insolublizing the A group element remained unreacted in the reaction mixture, or at the stage of sintering the composition according to the process of the invention.

It is already known that the mixing of a perovskite compound particles with a low tempeature melting glassy substance permits to lower the sintering temperature. However, the conventional perovskite compound particles are large in size as hereinbefore mentioned, the sintered body of the mixture has been found unsatisfactory in electric properties. On the contrary to this, since the composition of the invention is much smaller in particle size, a mixture of the composition with a low temperature melting inorganic oxide compound is sinterable at low temperatures as low as about 900° C. to 1100° C. Preferred oxides usable in the invention include oxides of Bi, B, Pb or W which melt at temperatures prefeably from about 400°-1000° C. In a typical manner, the composition of the invention is mixed with a powder of the oxide in amounts of about 1-30% by weight, preferably about 3-15% by weight, based on the weight of the composition, and molded to granules, which is then sintered at temperatures of about 900°-1100° C., to provide a highly densified sintered product having satisfactory electric properties.

EXAMPLE 1

An amount of 87.1 g of an aqueous titanium chloride solution including partially hydrolyzed titanium tetrachloride, the titanium chloride having the formula of $TiCl_{2.36}(OH)_{1.64}$ and the solution containing therein 16.5% by weight of titanium (0.30 mole) and 28.8% by weight of chlorine, was mixed with 281.9 g of a 26% by weight aqueous solution of $BaCl_2.2H_2O$ (Ba: 0.30 mole).

The mixture was then added to 167 g of a 38.5% by weight aqueous solution of sodium hydroxide maintained at a temperature of 40° C. over 60 minutes, and then water was added to the resultant mixture to provide a slurry of a mixture of titanium hydroxide and barium hydroxide of a concentration of 0.5 mole/l in terms of $BaTiO_3$.

An amount of 600 ml of the slurry as a feed material, was placed in a 1 liter capacity Hasteloy autoclave, heated to about 150° C. over 90 minutes with stirring of a rate of 550-600 rpm, and was subjected to the hydrothermal reaction at about 150° C. for 5 hours.

After the reaction, the slurry was washed with water, and the filtrate was analyzed by the atomic absorption spectroscopy to find that the conversion of barium (Ba conversion) was 98.3%, wherein the Ba conversion is defined as: [(moles of Ba in the feed material)−(moles of Ba in the filtrate)]/(moles of Ba in the feed material)×100 (%).

The solid reaction product as a filtered cake was again dispersed in the filtrate, and carbon dioxide was blown into the slurry to adjust the pH of the slurry to 6.5. The resultant slurry was washed with water until no chloride ion was detected, filtered and dried at 110° C. to provide a composition which contained a perovskite compound, $BaTiO_3$.

Figure 2:
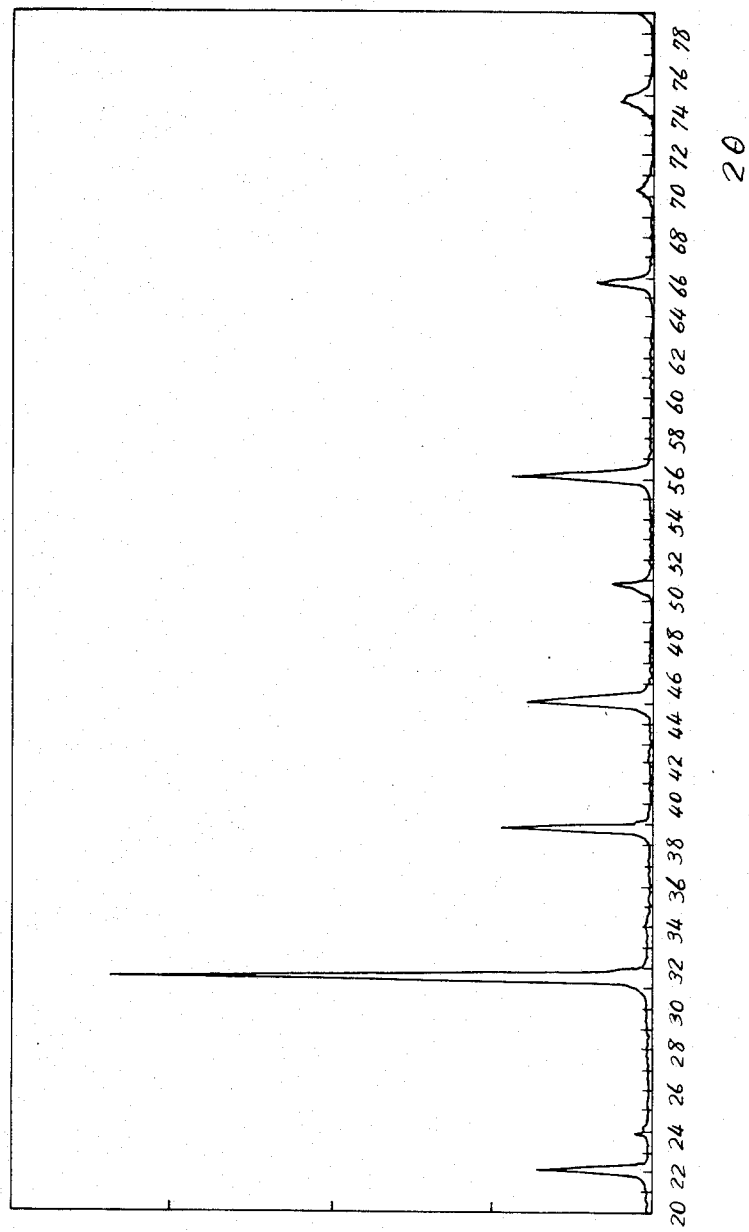
Figure 3:
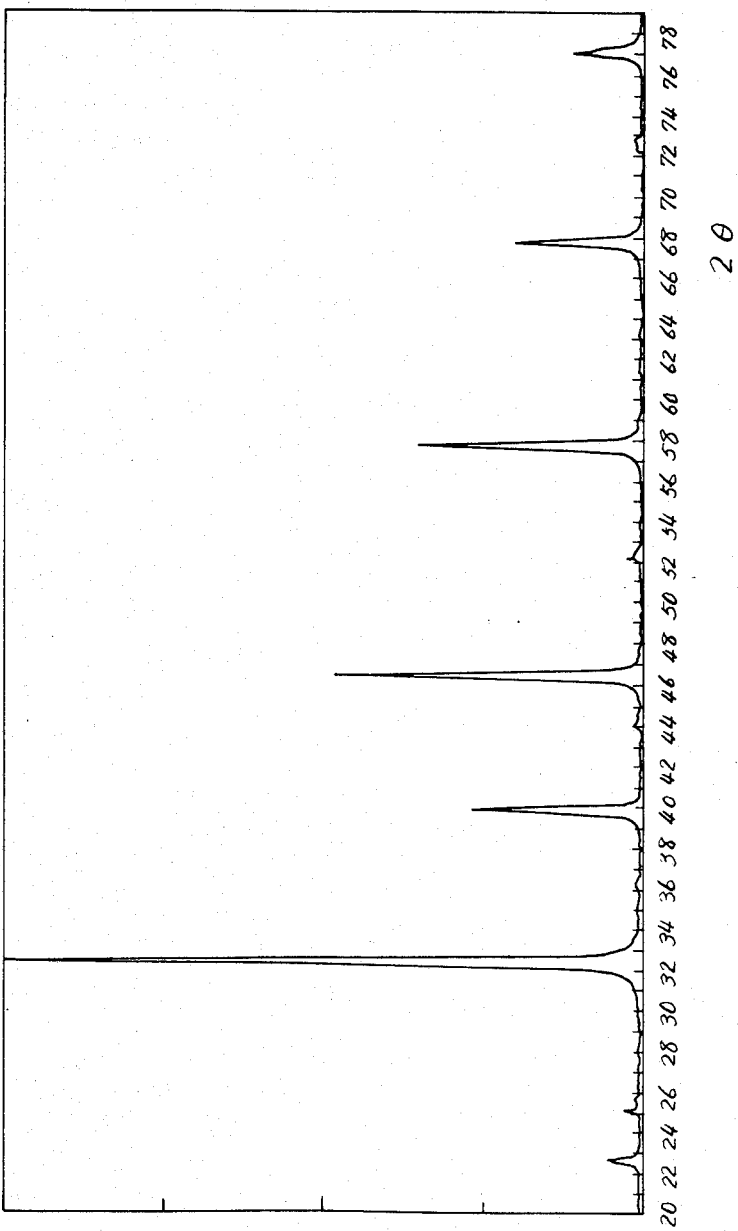

FIG. 3 is an electron microscopic photograph of 50000 magnifications to show that the particle is spherical and uniform diameter, and based on this photograph the particle was found about 0.08 μm in average diameter. FIG. 2 is an X-ray diffraction diagram of the composition. The Ba/Ti ratio in the composition was found 1.00 by fluorescent X-ray analysis.

EXAMPLE 2

An amount of 119.4 g of titanium isopropoxide (Ti: 0.42 mole) was dissolved in 120 ml of isopropyl alcohol. Under a nitrogen atmosphere, the solution was added dropwise over 1 hour to 294.4 g of a 45% by weight aqueous solution of $Ba(OH)_2.8H_2O$ at 80° C., and then water was added to the resultant mixture to provide a slurry of a mixture of titanium hydroxide and barium hydroxide of a concentration of 0.7 mole/l in terms of $BaTiO_3$.

The slurry was subjected to the hydrothermal reaction in the same manner as in Example 1, and the Ba conversion was found 96.0%. The same barium fixing as in Example 1 provided a composition which contained $BaTiO_3$ about 0.07 μm in particle size, and the A/B ratio in the composition was found 1.00 by fluorescent X-ray analysis. The composition showed substantially the same X-ray diffraction as that of Example 1.

EXAMPLE 3

An amount of 119.4 g of titanium isopropoxide (Ti: 0.42 mole) was dissolved in 120 ml of isopropyl alcohol. The solution was added dropwise to 76 ml of water over 1 hour at room temperature, to provide a slurry of titanium hydroxide.

The titanium hydroxide was filtered, and was added thereto 132.5 g of $Ba(OH)_2.2H_2O$ (Ba: 0.42 mole) and water under a nitrogen atmosphere to provide a slurry of a mixture of titanium hydroxide and barium hydroxide of a concentration of 0.7 mole/l in terms of $BaTiO_3$.

The slurry was subjected to the hydrothermal reaction in the same manner as in Example 1, and the Ba conversion was found 95.6%. The barium fixing with the use of sodium carbonate, followed by washing the resultant mixture with water, provided a composition which contained $BaTiO_3$, about 0.07 μm in particle size, and the A/B ratio in the composition was found 1.00 by fluorescent X-ray analysis. The composition showed substantially the same X-ray diffraction as the composition of Example 1.

EXAMPLE 4

An amount of 139.3 g of the same titanium chloride solution (Ti: 0.48 mole) as used in Example 1 was mixed with 1250 ml of water at a temperature of 40° C., and to the resultant solution was added 483 ml of a 5.0% by weight ammonia water over 30 minutes, to provide a slurry of titanium hydroxide. The titanium hydroxide was washed with water and filtered, and then was added thereto in a nitrogen atmosphere 151.4 g of $Ba(OH)_2.8H_2O$ (Ba: 0.48 mole), followed by the addition of water to the reaction mixture, to provide a slurry of a mixture of titanium hydroxide and barium hydroxide of a concentration of 0.8 mole/l in terms of $BaTiO_3$.

The slurry was then subjected to the hydrothermal reaction for 5 hours in the same manner as in Example 1, to provide a reaction mixture in which Ba conversion was found 95.3%. Carbon dioxide was blown into the reaction mixture to adjust the A/B ratio therein to 1.00 in the same manner as Example 1, washed with water until no chlorine was detected, filtered and dried, to provide a composition of Ba/Ti ratio of 1.00 which contained $BaTiO_3$ of 0.09 μm in particle size. The composition showed substantially the same X-ray diffraction diagram as that of Example 1.

EXAMPLE 5

An amount of 87.1 g of the same titanium chloride solution as used in Example 1 (Ti: 0.30 mole) was added dropwise to 458.5 g of a 45% by weight aqueous solution of $Ba(OH)_2.8H_2O$ (Ba: 0.654 mole) over 1 hour at 80° C. under a nitrogen atmosphere, and then water was added to the resultant mixture, to provide a slurry of a mixture of titanium hydroxide and barium hydroxide of a concentration of 0.5 mole/l in terms of $BaTiO_3$. An amount of 0.354 mole of 0.654 mole of barium was reacted with the titanium chloride.

The slurry was subjected to the hydrothermal reaction in the same manner as in Example 1. After the reaction, the slurry was made neutral to pH of 7.0 by adding to the slurry 4N acetic acid, washed with hot water until no barium ion was detected.

A small portion of the slurry was sampled, filtered, and the obtained solid was dried. The solid was subjected to the fluorescent X-ray analysis to find that Ba/Ti was 0.953. To the slurry after the sampling was added $Ba(OH)_2.8H_2O$ in an amount of 0.047 mole in relation to 1 mole of titanium to adjust the A/B ratio to 1.00 in the slurry, and then carbon dioxide was blown into the slurry until the pH of the slurry came to 6.5. The resulting reaction mixture was filtered, washed with water and dried at 110° C., to provide a composition which contained $BaTiO_3$ about 0.04 μm in particle size, and the A/B ratio in the composition was found 1.00 by fluorescent X-ray analysis. The composition showed substantially the same X-ray diffraction as the composition of Example 1.

EXAMPLE 6

An amount of 76.7 g of barium isopropoxide (Ba: 0.30 mole) and 85.3 g of titanium isopropoxide (Ti: 0.30 mole) were dissolved in 320 ml of isopropyl alcohol under a nitrogen atmosphere, and the resulting solution was refluxed for 2 hours. Then 65 ml of decarbonized water was added dropwise to the solution over 30 minutes to hydrolyze the alkoxides, followed by cooling to room temperature, and further by adding of water to the reaction mixture, to provide a slurry of a mixture of titanium hydroxide and barium hydroxide of a concentration of 0.5 mole/l in terms of $BaTiO_3$.

The slurry was subjected to the hydrothermal reaction in the same manner as in Example 1. The barium fixing by sodium laurate provided a composition which contained $BaTiO_3$ about 0.02 μm in average particle size, and the Ba/Ti ratio in the composition was found 1.00 by fluorescent X-ray analysis. The composition showed substantially the same X-ray diffraction as the composition of Example 1.

EXAMPLES 7 and 8

In the same manner as in Example 5, slurries of a mixture of titanium hydroxide and barium hydroxide of varied concentrations in terms of $BaTiO_3$ were prepared by varying the amounts of the titanium chloride solution and $Ba(OH)_2.8H_2O$ used in the preparation of the hydroxide mixture. However, in Example 7, $Ba(OH)_2.8H_2O$ remained in part undissolved since the amount used was over the solubility.

The resultant slurries each were subjected to the hydrothermal reaction in the same manner as in Example 1, and thereafter were worked up in the same manner as in Example 5.

The concentration in terms of $BaTiO_3$ of the slurry of the hydroxide mixture, the moles of the $Ba(OH)_2.8H_2O$ in relation to 1 mole of titanium used to control the A/B ratio in the reaction mixture, the particle size of the resultant composition and Ba/Ti ratio in the composition are shown in Table 1 together with the previously mentioned results of Example 5. All the compositions obtained showed substantially the same X-ray diffraction diagrams as the composition of Example 1.

TABLE 1

| Examples | Concentrations of Mixtures (mole/l)[1] | Moles of $Ba(OH)_2.8H_2O$ Added to the Reaction Mixture[2] | Compositions | |
|---|---|---|---|---|
| | | | Particle Sizes (μm) | Ba/Ti Ratios |
| 7 | 0.8 | 0.042 | 0.03 | 1.00 |
| 5 | 0.5 | 0.047 | 0.05 | 1.00 |
| 8 | 0.2 | 0.050 | 0.07 | 1.00 |

[1]In terms of $BaTiO_3$.
[2]Per mole of Ti.

EXAMPLES 9 to 11

Slurries of a mixture of titanium hydroxide and barium hydroxide of varied Ba/Ti ratios but a constant concentration of 0.5 mole/l in terms of $BaTiO_3$ were prepared in the same manner as in Example 4.

The each slurry was subjected to the hydrothermal reaction in the same manner as in Example 1. After the reaction, the slurry was made neutral to pH of 7.0 by adding to the slurry 4N acetic acid, washed with hot water until no barium ion was detected.

A small portion of the slurry was sampled, filtered, and the separated precipitate was dried. The precipitate was subjected to the fluorescent X-ray analysis to find the Ba/Ti ratio therein. To the slurry after the sampling, $Ba(OH)_2.8H_2O$ was added in amounts to adjust the Ba/Ti ratio in the slurry to the desired value. Then carbon dioxide was blowed into the slurry until the pH of the slurry came to 6.5. The resulting reaction mixture was filtered, washed with water and dried at 110° C., to provide a composition of the invention which contained $BaTiO_3$.

The Ba/Ti ratio in the mixture of titanium chloride and $Ba(OH)_2.8H_2O$, Ba conversion, moles of the $Ba(OH)_2.8H_2O$ in relation to 1 mole of titanium used to control the Ba/Ti ratio in the resulting composition, and the particle size of the resultant composition are shown in Table 2. All the compositions obtained showed substantially the same X-ray diffractions as the composition of Example 1.

TABLE 2

| Examples | Ba/Ti Ratios in Hydroxide Mixture | Ba Conversions (%) | Moles of $Ba(OH)_2.8H_2O$ Added to the Reaction Mixture[1] | Compositions | |
|---|---|---|---|---|---|
| | | | | Particle Size (μm) | Ba/Ti Ratios |
| 9 | 1.0 | 96.2 | 0.038 | 0.14 | 0.99 |
| 10 | 1.5 | 99.0 | 0.010 | 0.19 | 1.00 |
| 11 | 3.0 | 94.1 | 0.059 | 0.04 | 1.00 |

[1]Per mole fo Ti.

EXAMPLES 12 to 14

In the same manner as in Example 1 except the neutralization temperature, a mixture of hydroxides was prepared of the concentration of 0.5 mole/l in terms of $BaTiO_3$. The slurry was then subjected the hydrothermal reaction in the same manner as in Example 1, and then carbon dioxide was blown into the reaction mixture to adjust the Ba/Ti ratio in the reaction mixture to 1.00 in the same manner as in Example 1. The resultant mixture was washed with water until no chloride ion was detected, and dried, to provide a composition.

The reaction temperature of the hydroxide mixture preparation. Ba conversion in the hydrothermal reaction, particle size of the resultant composition and Ba/Ti ratio in the composition are shown in Table 3. The results of Example 1 are also shown in the table. All the compositions obtained showed substantially the same X-ray diffractions as the composition of Example 1.

EXAMPLES 15 to 17

The same mixture of hydroxides as used in Example 1 was subjected to the hydrothermal reaction in the same manner as in Example 1 except the reaction temperature, and to the resultant reaction mixture carbon dioxide was blowed into to adjust the Ba/Ti ratio in the mixture of 1.00. The reaction mixture was then washed with water until no chloride ion was detected, filtered, and dried, to provide a composition which contained $BaTiO_3$.

The hydrothermal reaction temperature, Ba conversion, particle size and Ba/Ti ratio in the composition are shown in Table 4 together with the previous results of Example 1. All the compositions showed substantially the same X-ray diffraction diagrams as that of Example 1.

TABLE 3

| Examples | Neutralization Temperatures (°C.) | Ba Conversions (%) | Compositions | |
|---|---|---|---|---|
| | | | Particle Sizes (μm) | Ba/Ti Ratios |
| 12 | 20 | 98.9 | 0.09 | 1.00 |
| 1 | 40 | 98.3 | 0.08 | 1.00 |
| 13 | 60 | 99.1 | 0.06 | 1.00 |
| 14 | 90 | 99.5 | 0.04 | 1.00 |

TABLE 4

| Examples | Reaction Temperatures (°C.) | Ba Conversions (%) | Compositions | |
|---|---|---|---|---|
| | | | Particle Sizes (μm) | Ba/Ti Ratios |
| 15 | 120 | 96.2 | 0.07 | 1.00 |
| 1 | 150 | 98.3 | 0.08 | 1.00 |
| 16 | 200 | 99.4 | 0.09 | 1.00 |

TABLE 4-continued

| Examples | Reaction Temperatures (°C.) | Ba Conversions (%) | Compositions Particle Sizes (μm) | Ba/Ti Ratios |
|---|---|---|---|---|
| 17 | 300 | 99.3 | 0.12 | 1.00 |

EXAMPLES 18 and 19

The slurry of the mixture of hydroxides as prepared in Example 4 was subjected to the hydrothermal reaction in the same manner as in Example 4 except the reaction time.

The hydrothermal reaction time, Ba conversion therein, particle size of the resultant composition and Ba/Ti ratio in the composition are shown in Table 5 together with the previous results of Example 4. All the compositions obtained showed substantially the same X-ray diffractions as the composition of Example 1.

TABLE 5

| Examples | Reaction Periods (hr) | Ba Conversions (%) | Compositions Particle Sizes (μm) | Ba/Ti Ratios |
|---|---|---|---|---|
| 18 | 1 | 94.0 | 0.09 | 1.00 |
| 4 | 5 | 95.3 | 0.09 | 1.00 |
| 19 | 25 | 96.9 | 0.12 | 1.00 |

EXAMPLES 20 to 27

The slurry of the mixture of hydroxides as prepared in Example 4 was subjected to the hydrothermal reaction in the same manner as in Example 4, and the Ba conversion was determined in the same manner as in Example 1.

The reaction mixture after the hydrothermal reaction was filtered, and the solid was again dispersed in the filtrate to a slurry. An insolubilizing agent as shown in Table 6 was added to the slurry in amounts 1.5 times as much as the unreacted barium, left standing for a day, washed with water until no chloride ion was detected, filtered, and dried, to provide a composition.

In Example 27 as a specific example, Amberlight IRC-50 was jet-milled, and 6 g of the powder of 44 μm under mesh was added to the slurry and stirred for 3 hours. Then the slurry was washed with water until no chloride ion was detected, filtered and dried at 110° C., to provide a composition.

The Ba conversion in the hydrothermal reaction, insolubilizing agent, its amount used and concentration in the slurry, and Ba/Ti ratio in the composition are shown in Table 6 together with the previous results of Example 4. All the compositions obtained showed substantially the same X-ray diffraction as the composition of Example 1.

TABLE 6

| Examples | Ba Conversions (%) | Insolubilizing Agents Amounts Used Concs. (mole)[1] (wt. %) | | Amounts of Agent Used (mole)[1] (wt. %)[2] | | Ba/Ti Ratios of Compositions |
|---|---|---|---|---|---|---|
| 4 | 95.3 | Carbon dioxide | | (to pH 6.5) | (gas) | 1.00 |
| 20 | 95.1 | Ammonium carbonate | 0.0353 | 5.0 | | 1.00 |
| 21 | 94.9 | Sodium carbonate | 0.0367 | 4.7 | | 1.00 |
| 22 | 95.7 | Oxalic acid | 0.0310 | 3.4 | | 1.00 |
| 23 | 95.0 | Ammonium oxalate | 0.0360 | 3.7 | | 1.00 |
| 24 | 95.2 | Sodium oxalate | 0.0346 | 3.0 | | 1.00 |
| 25 | 95.5 | Sodium laurate | 0.0324 | 9.3 | | 1.00 |
| 26 | 95.3 | Sodium ketomalonate | 0.0338 | 1.7 | | 1.00 |
| 27 | 95.1 | Cation exchange resin | (6 g) | (solid) | | 1.00 |

[1]Per mole of Ti.
[2]In the hydroxide slurry.

EXAMPLE 28

An amount of 127.6 g of $Sr(OH)_2 \cdot 8H_2O$ (Sr: 0.48 mole) was mixed with 19.3 g of a 10.9% by weight (in terms of $TiO_2$) slurry of titanium hydroxide (Ti: 0.48 mole) prepared in the same manner as in Example 4, and water was added to the resultant mixture, to provide a slurry of a mixture of titanium hydroxide and strontium hydroxide of a concentration of 0.8 mole/l in terms of $SrTiO_3$.

The slurry was subjected to the hydrothermal reaction in the same manner as in Example 1. The barium and strontium fixing by oxalic acid provided a composition of the Sr/Ti ratio of 1.00 which contained $SrTiO_3$. The X-ray diffraction diagram of the composition is shown in FIG. 3.

EXAMPLE 29

An amount of 85.3 g of titanium isopropoxide (Ti: 0.30 mole) was added to 139 g of a 30% by weight aqueous solution of nitric acid at room temperature over 40 minutes to prepare titanyl nitrate. The titanyl nitrate solution was mixed with 331.2 g of a 30% by weight aqueous solution of $Pb(NO_3)_2$ (Pb: 0.30 mole) under a nitrogen atmosphere. The resultant solution was then added to a 30% by weight urea solution as a homogeneous precipitating agent at 80° C. in 1 hour, followed by heating and refluxing for 2 hours. In this reaction, the urea produced ammonium hydroxide, which produced titanium hydroxide by the reaction of the ammonium hydroxide with the titanyl nitrate.

The resultant slurry was washed with water, and then was again dispersed in water. 30 ml of 20% by weight aqueous sodium hydroxide solution was added to the slurry, followed by the addition of water to the slurry, to provide a slurry of a mixture of hydroxides of lead and titanium, respectively, of a concentration of 0.5 mole/l in terms of $PbTiO_3$.

Figure 4:
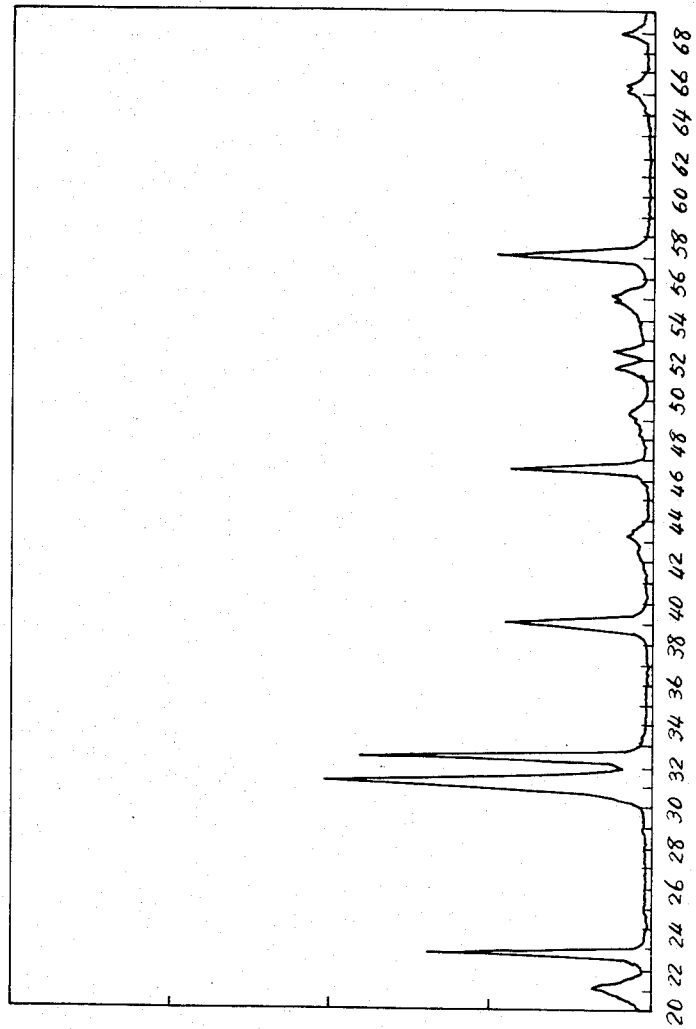

The slurry was subjected to the hydrothermal reaction in the same manner as in Example 1. The lead fixing by carbon dioxide as in Example 1 provided a composition of the Pb/Ti ratio of 1.00 which contained $PbTiO_3$. The X-ray diffraction diagram of the composition is shown in FIG. 4.

EXAMPLE 30

An amount of 87.1 g of aqueous solution of the titanium choride solution (Ti: 0.30 mole) was mixed with 118 ml of water, and the resulting solution was added to 170 g of a 30% by weight aqueous solution of urea at 80° C. over 1 hour, followed by further heating and refluxing for 10 hours. Thereafter a 5% by weight aqueous solution of ammonia was added to the above solution to adjust the pH thereof to 10, to provide a slurry of titanium hydroxide.

In the same manner as above, 331.2 g of a 30% by weight aqueous solution of Pb(NO$_3$)$_2$ (Pb: 0.30 mole) was added to 72 g of a 30% by weight aqueous solution of urea at 80° C. over 1 hour, followed by further heating and refluxing for 10 hours. Thereafter a 5% by weight aqueous solution of ammonia was added to the above solution to adjust the pH thereof to 10, to provide a slurry of lead hydroxide.

The slurry of titanium hydroxide and the slurry of lead hydroxide were mixed together, the mixture was washed with water until no chloride and nitrate ions were detected, and filtered. The solid was then again dispersed in water, and 15 g of a 20% by weight aqueous solution of sodium hydroxide was added to the slurry, followed by the addition of water to the slurry, to provide a slurry of a concentration of 0.5 mole/l in terms of PbTiO$_3$.

The slurry was subjected to the hydrothermal reaction in the same manner as in Example 1. The same lead fixing as in Example 29 provided a composition of the Pb/Ti ratio of 1.00. The composition showed substantially the same X-ray diffraction diagram as that of Example 29.

EXAMPLE 31

An amount of 147.9 g of a 25% by weight (as ZrO$_2$) aqueous solution of zirconyl nitrate solution (Zr: 0.30 mole) was mixed with 331.2 g of a 30% by weight of an aqueous solution of Pb(NO$_3$)$_2$ (Pb: 0.30 mole). To the resulting solution was added 511 g of a 5% by weight aqueous solution of ammonia at a temperature of 50° C. over 1 hour to provide a slurry of a mixture of zirconium hydroxide and lead hydroxide. The mixture was washed with water until no nitrate ion was detected, and filtered. The solid was then again dispersed in water to a slurry, and 60 g of a 20% by weight aqueous solution of sodium hydroxide was added to the slurry, followed by the addition of water to the slurry, to provide a slurry of a concentration of 0.5 mole/l in terms of PbZrO$_3$.

Figure 5:
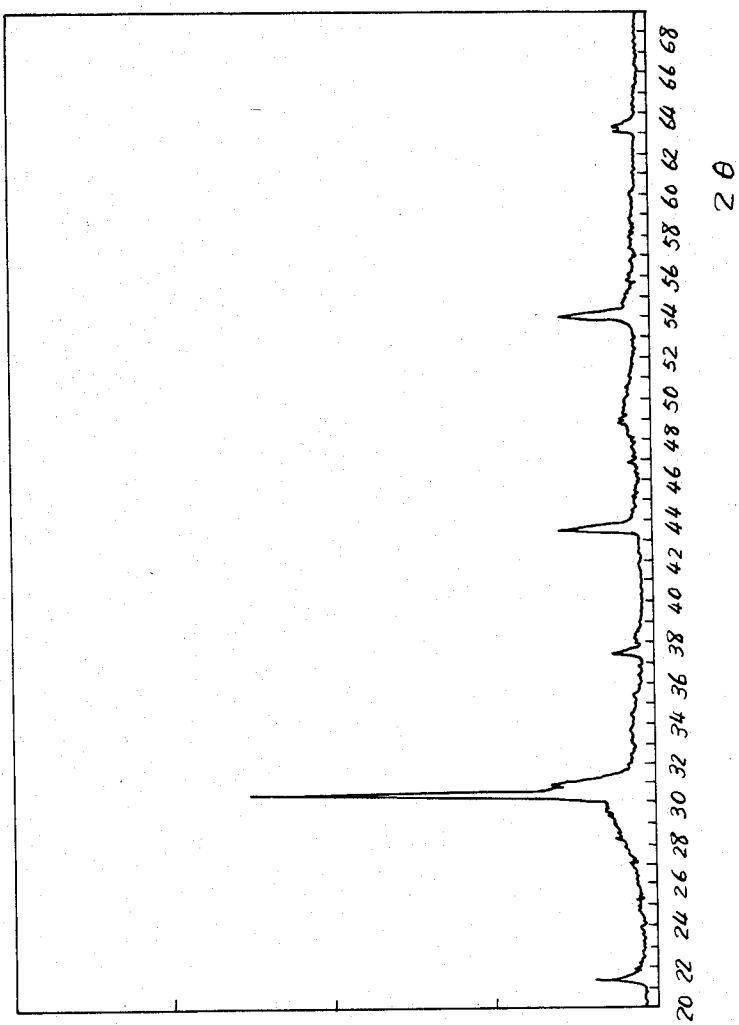

An amount of 600 ml of the slurry were placed in a Hasteloy autoclave, and was subjected to the hydrothermal reaction at a temperature of 150° C. for a period of 18 hours. After the reaction, carbon dioxide was blowed into to the resultant reaction mixture to adjust the Pb/Zr ratio in the mixture to 1.00. The reaction mixture was then washed with water until no nitrate ion was detected, filtered, and dried, to provide a composition which contained PbZrO$_3$ of Pb/Zr ratio of 1.00. The X-ray diffraction diagram of the composition is shown in FIG. 5.

EXAMPLE 32

An amount of 92.4 g of a cake containing zirconium oxyhydroxide in an amount of 40% by weight (as ZrO$_2$, Zr: 0.30 mole) was mixed with 94.6 g of Ba(OH)$_2$.8H$_2$O (Ba: 0.30 mole), and water was added to the mixture to provide a slurry. To the slurry was added 30 g of a 20% by weight aqueous solution of sodium hydroxide, followed by the addition of water to the slurry, to provide a slurry of a concentration of 0.6 mole/l in terms of BaZrO$_3$.

Figure 6:
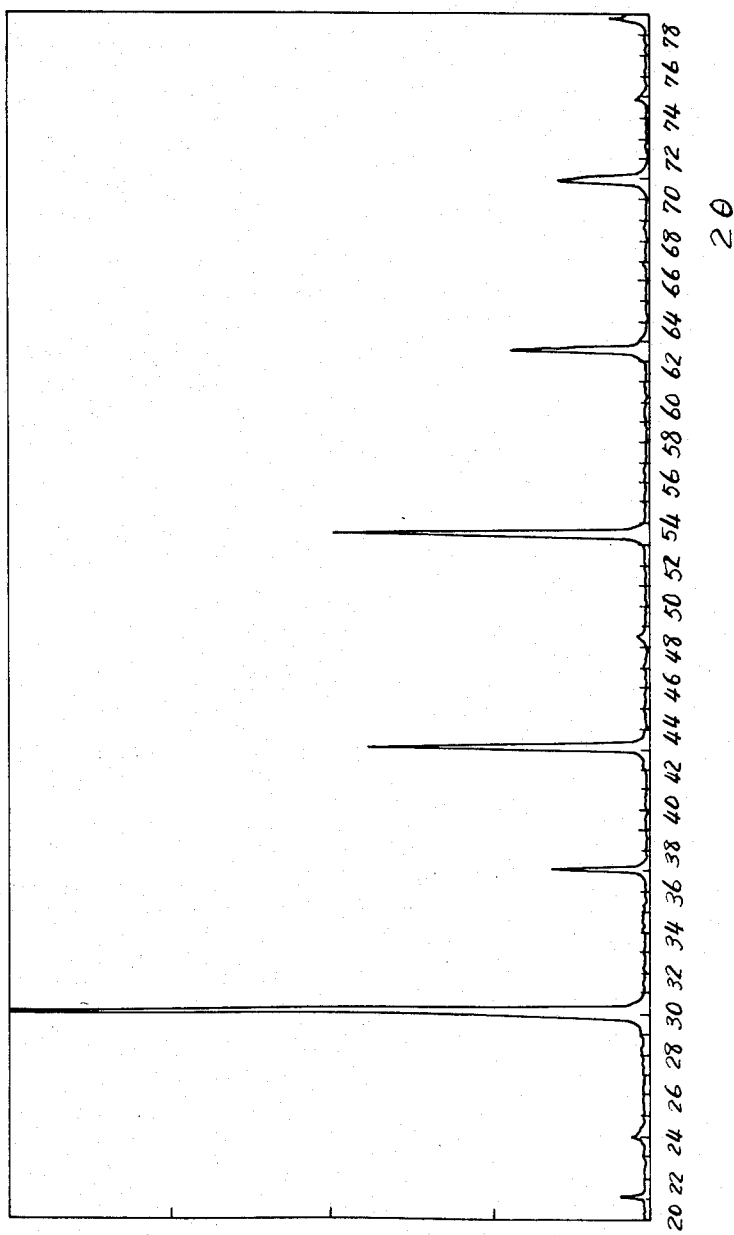

The slurry was subjected to the hydrothermal reaction in the same manner as in Example 1. The same barium fixing as in Example 1 provided a composition of the Ba/Zr ratio of 1.00 which contained BaZrO$_3$. The X-ray diffraction diagram of the composition is shown in FIG. 6.

EXAMPLE 33

An amount of 158.5 g of a 30% by weight of an aqueous solution of SrCl$_2$ solution (Sr: 0.30 mole) was mixed with 123.2 g of a 30% by weight (as ZrO$_2$) aqueous solution of zirconium oxychloride (Zr: 0.30 mole) under an nitrogen atmosphere. The resultant aqueous solution was added to 270 g of a 20% by weight aqueous solution of sodium hydroxide over 1 hour, followed by the addition of water to the slurry, to provide a slurry of a concentration of 0.5 mole/1 in terms of SrZrO$_3$.

Figure 7:
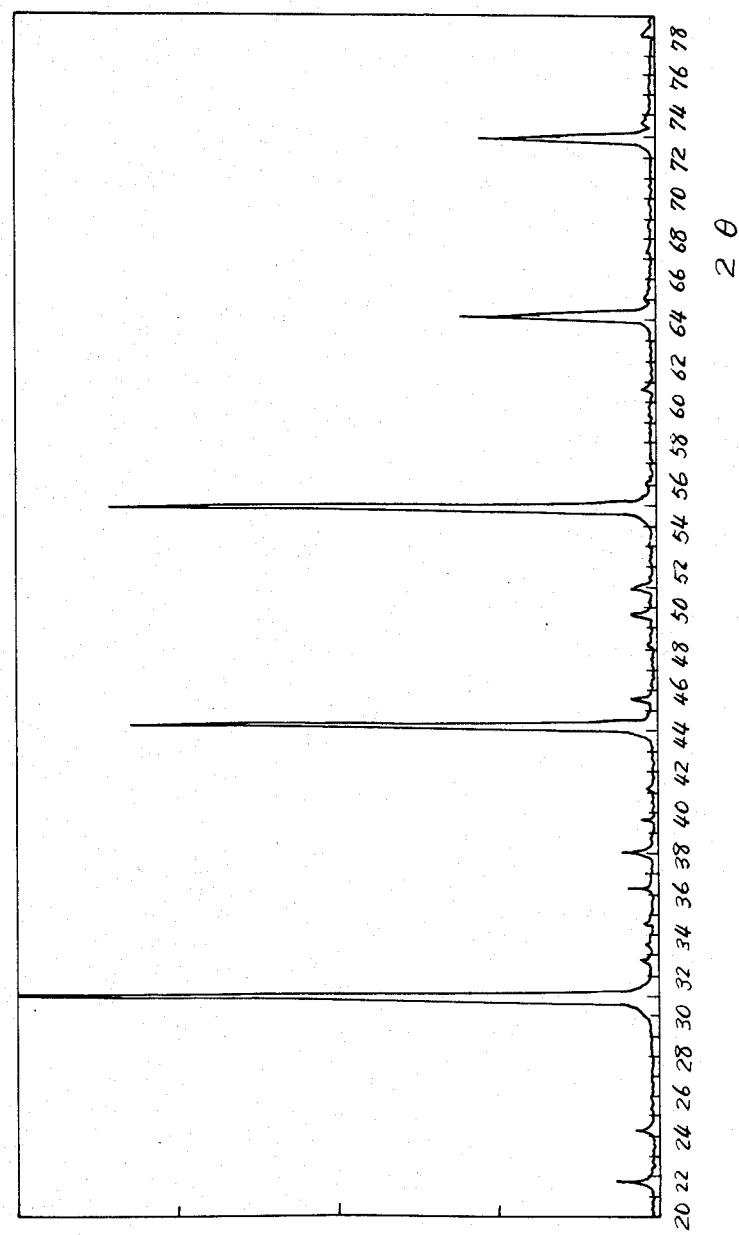

The slurry was subjected to the hydrothermal reaction in the same manner as in Example 1. The same strontium and barium fixing as in Example 1 provided a composition of the Sr/Zr ratio of 1.00 which contained SrZrO$_3$. The X-ray diffraction diagram of the composition is shown in FIG. 7.

EXAMPLE 34

An amount of 110.3 g of a 40% by weight an aqueous solution of CaCl$_2$.2H$_2$O (Ca: 0.30 mole) was mixed with 195.4 g of a 40% by weight aqueous solution of SnCl$_4$ (Sn: 0.30 mole) under a nitrogen atmosphere. The resultant aqueous solution was added to 270 g of a 20% by weight aqueous solution of sodium hydroxide at a temperature of 50° C. over 1 hour, followed by the addition of water to the slurry, to provide a slurry of a concentration of 0.5 mole/l in terms of CaSnO$_3$.

Figure 8:
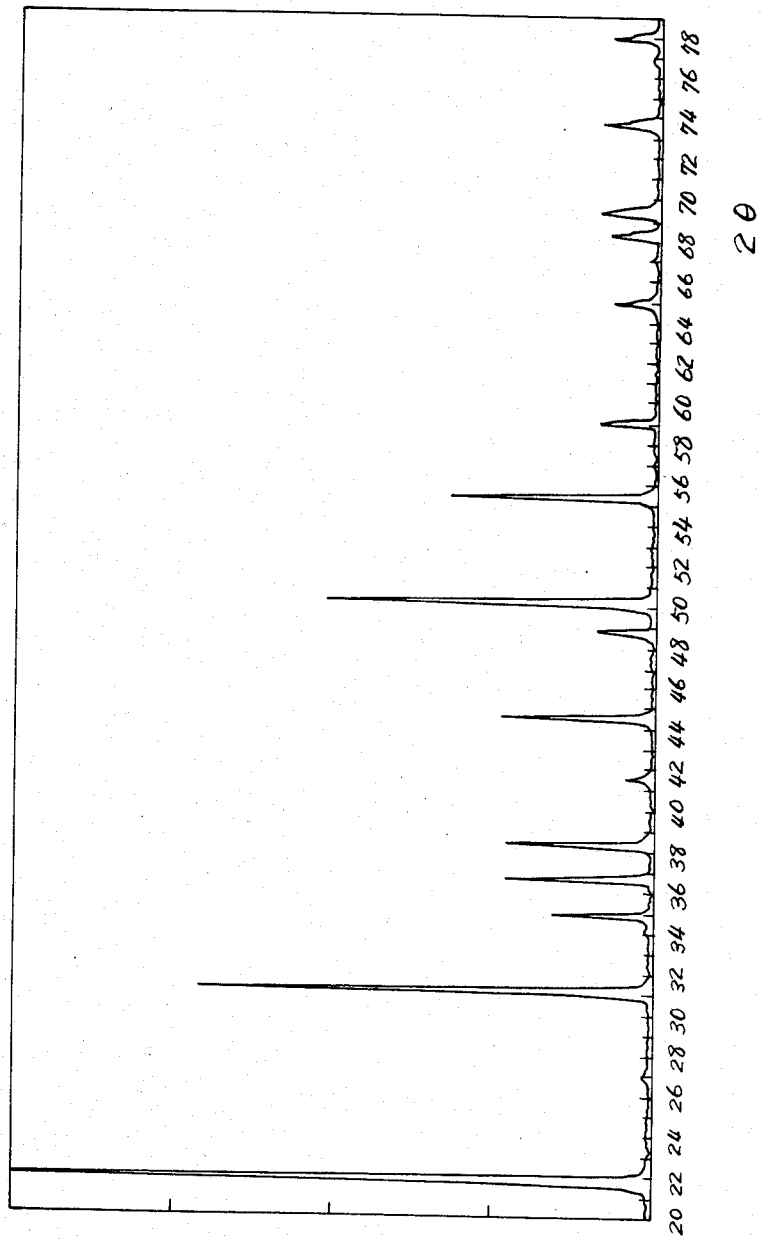

The slurry was subjected to the hydrothermal reaction in the same manner as in Example 1. The calcium fixing with the use of carbon dioxide as in Example 1 provided a composition of the Ca/Sn ratio of 1.00 which contained CaSnO$_3$. The X-ray diffraction diagram of the composition is shown in FIG. 8.

EXAMPLE 35

An amount of 56.9 g of titanium tetrachloride (Ti: 0.30 mole) was added to 60 g of ice water with stirring to provide an aqueous solution of titanium tetrachloride. Under a nitrogen atmosphere the aqueous solution was mixed with 14.7 g of a 30% by weight aqueous solution of CaCl$_2$.2H$_2$O (Ca: 0.030 mole) and 253.7 g of a 26% by weight aqueous solution of BaCl$_2$.2H$_2$O (Ba: 0.27 mole). The mixed solution was then added to 240 g of a 35% by weight aqueous solution of sodium hydroxide at a temperature of 60° C. over 1 hour, followed by the addition of water to the slurry, to provide a slurry of a mixture of hydroxides of titanium, calcium and barium of a concentration of 0.5 mole/l in terms of Ba$_{0.9}$Ca$_{0.1}$TiO$_3$.

The slurry was subjected to the hydrothermal reaction in the same manner as in Example 1. The same barium and calcium fixing as in Example 1 provided a composition of the (Ba+Ca)/Ti ratio of 1.00 which contained Ba$_{0.9}$Ca$_{0.1}$TiO$_3$ as a perovskite compound.

EXAMPLE 36

An amount of 31.7 g of a 30% by weight aqueous solution of SrCl$_2$ (Sr: 0.060 mole), 255.5 g of a 26% by weight aqueous solution of BaCl$_2$.2H$_2$O (Ba: 0.24 mole) and 87.1 g of the titanium chloride solution (Ti: 0.30 mole) were mixed together under a nitrogen atmosphere. The resultant aqueous solution was then added to 184 g of a 35% by weight aqueous solution of sodium hydroxide at a temperature of 60° C. over 1 hour, followed by the addition of water to the slurry, to provide a slurry of a mixture of hydroxides of titanium, strontium and barium of a concentration of 0.5 mole/l in terms of $Ba_{0.8}Sr_{0.2}TiO_3$.

The slurry was subjectedd to the hydrothermal reaction in the same manner as in Example 1. The same barium and strontium fixing as in Example 1 provided a composition of the (Ba+Sr)/Ti ratio of 1.00 which contained $Ba_{0.8}Sr_{0.2}TiO_3$ as a perovskite comound.

EXAMPLE 37

A mixture of 85.3 g of titanium isopropoxide (Ti: 0.30 mole) and 8.5 g of magnesium isopropoxide (Mg: 0.60 mole) was dissolved in 95 ml of isopropyl alcohol. The solution was then added to 252.4 g of a 30% by weight aqueous solution of $Ba(OH)_2.8H_2O$ (Ba: 0.24 mole) at a temperature of 80° C. over 1 hour, to subject the alkoxides to the hydrolysis in the $Ba(OH)_2.8H_2O$ solution. Then water was added thereto to provide a slurry of a mixture of hydroxides of titanium, magnesium and barium of a concentration of 0.5 mole/l in terms of $Ba_{0.9}Mg_{0.1}TiO_3$.

The slurry was subjected to the hydrothermal reaction in the same manner as in Example 1. The same barium and magnesium fixing as in Example 1 provided a composition of the (Ba+Mg)/Ti ratio of 1.00 which contained $Ba_{0.9}Mg_{0.1}TiO_3$ as a perovskite comound.

EXAMPLE 38

An amount of 66.2 g of a 30% by weight aqueous solution of $Pb(NO_3)_2$ (Pb: 0.060 mole), 225.5 g of a 26% by weight aqueous solution of $BaCl_2.2H_2O$ (Ba: 0.24 mole) and 87.1 g of the titanium chloride aqueous solution (Ti: 0.30 mole) were mixed together under a nitrogen atmosphere. The resultant aqueous solution was then added to 184 g of a 35% by weight aqueous solution of sodium hydroxide at a temperature of 60° C. over 1 hour, followed by the addition of water to the slurry, to provide a slurry of a hydroxide mixture of titanium, lead and barium of a concentration of 0.5 mole/l in terms of $Ba_{0.8}Pb_{0.2}TiO_3$.

The slurry was subjected to the hydrothermal reaction in the same manner as in Example 1. The same barium and lead fixing as in Example 1 provided a composition of the (Ba+Pb)/Ti ratio of 1.00 which contained $Ba_{0.8}Pb_{0.2}TiO_3$ as a perovskite compound.

EXAMPLE 39

An amount of 261.8 g of a 28% by weight aqueous solution of $BaCl_2.2H_2O$ (Ba: 0.30 mole), 78.4 g of the titanium chloride aqueous solution (Ti: 0.27 mole) and 19.5 g of a 40% by weight of an aqueous solution of $SnCl_4$ (Sn: 0.030 mole) were mixed together under a nitrogen atmosphere. The resultant aqueous solution was then added to 172 g of a 38.5% by weight aqueous solution of sodium hydroxide at a temperature of 60° C. over 1 hour, followed by the addition of water to the slurry, to provide a slurry of a hydroxide mixture of titanium, tin and barium of a concentration of 0.5 mole/l in terms of $BaTi_{0.9}Sn_{0.1}O_3$.

The slurry was subjected to the hydrothermal reaction in the same manner as in Example 1. The same barium fixing as in Example 1 provided a composition of the Ba/(Ti+Sn) ratio of 1.00 which contained $BaTi_{0.9}Sn_{0.1}O_3$ as a perovskite compound.

EXAMPLE 40

An amount of 48.8 g of a 40% by weight of an aqueous solution of $SnCl_4$ (Sn: 0.075 mole), 65.3 g of the titanium chloride aqueous solution (Ti: 0.225 mole) and 180 g of a 38.5% by weight aqueous solution of sodium hydroxide were used, and the same procedure was repeated as in Example 39, to provide a composition of Ba/(Ti+Sn) ratio of 1.00 which contained a perovskite compound, $BaTi_{0.75}Sn_{0.25}O_3$.

EXAMPLE 41

A mixture of 76.7 g of barium isopropoxide (Ba: 0.30 mole), 76.7 g of titanium isopropoxide (Ti: 0.27 mole) and 12.4 g of hafnium isopropoxide (Hf: 0.030 mole) was dissolved in 330 ml of issopropyl alcohol, followed by refluxing for 2 hours under a nitrogen atmosphere. To the solution was added 65 ml of decarbonized water gradually over 30 minutes to hydrolyze the alkoxides, and then the reaction mixture was cooled to room temperature, water was added thereto to provide a slurry of a concentration of 0.5 mole/l in terms of $BaTi_{0.9}Hf_{0.1}O_3$.

The slurry was subjected to the hydrothermal reaction in the same manner as in Example 1. The same barium fixing as in Example 1 provided a composition of the Ba/(Ti+Hf) ratio of 1.00 which contained $BaTi_{0.9}Hf_{0.1}O_3$ as a perovskite compound.

EXAMPLE 42

An amount of 69.7 g of the titanium chloride aqueous solution (Ti: 0.24 mole) was mixed with 95 ml of water. The aqueous solution was mixed with 24.6 g of a 30% by weight (as $ZrO_2$) aqueous solution of zirconium oxychloride (Zr: 0.060 mole). Then the resultant solution was added under a nitrogen atmosphere to 396.4 g of a 30% by weight aqueous solution of a $Ba(OH)_2.8H_2O$ (Ba: 0.377 mole) at a temperature of 80° C. over 1 hour to provide a slurry of a mixture of zirconium hydroxide and titanium hydroxide. The slurry was then washed with water until no chloride ion was detected, and the solid mixture of the hydroxides was filtered.

An amount of 283.9 g of $Ba(OH)_2.8H_2O$ (Ba: 0.90 mole) was added to the solid hydroxide mixture in a nitrogen atmosphere, followed by the addition of water to the slurry, to provide a slurry of a concentration of 0.3 mole/l in terms of $BaTi_{0.8}Zr_{0.2}O_3$.

An amount of 600 ml of the slurry were placed in a Hasteloy autoclave, and was subjected to the hydrothermal reaction at a temperature of 200° C. for a period of 50 hours. After the reaction, the slurry was adjusted to pH of 7.0 by adding thereto 4N acetic acid, and washed with hot water until no barium ion was detected. The solid was filtered, and a small amount thereof sampled was dried, and was subjected to the fluorrescent X-ray analysis to find the Ba/(Ti+Zr) ratio to be 0.99.

The solid after the sampling was added to water again to provide a slurry, and $Ba(OH)_2.8H_2O$ was added to the slurry in an amount of 0.01 mole in relation to 1 mole of the total of Ti and Zr in the slurry, followed by blowing into of carbon dioxide into to the slurry to adjust the pH of the slurry to 6.5. The mixture was then dried, to provide a composition of the Ba/(Ti+Zr) ratio of 1.00 which contained $BaTi_{0.8}Zr_{0.2}O_3$.

Figure 9:
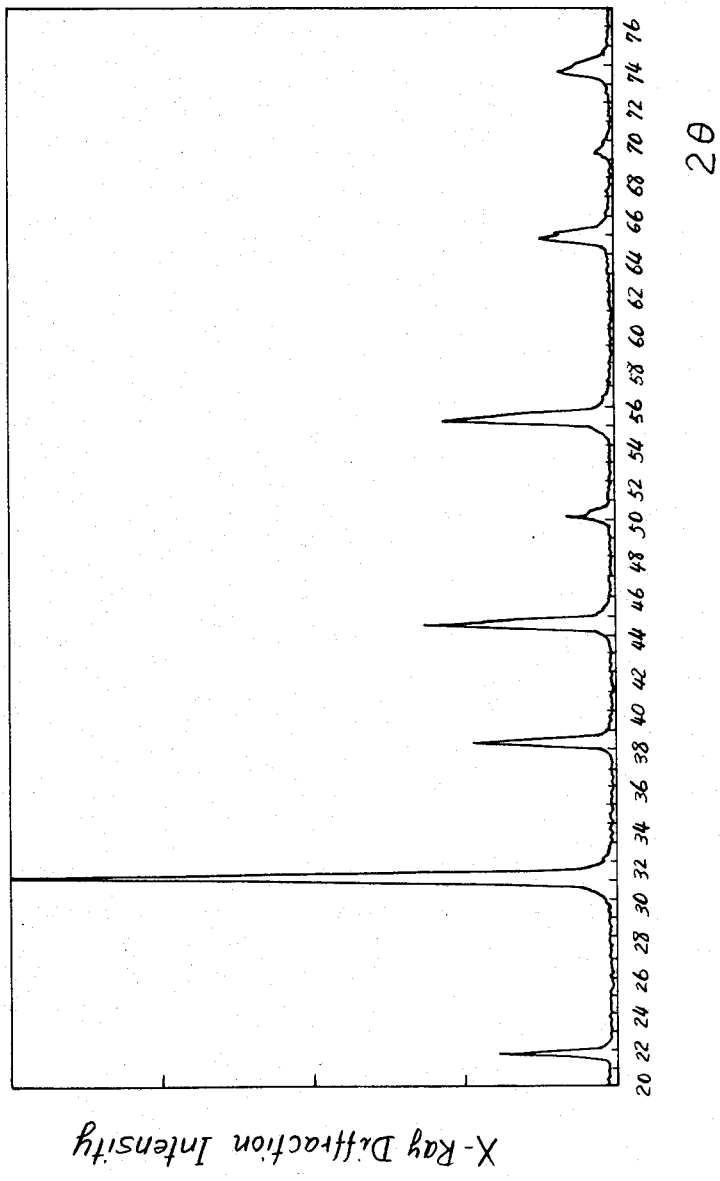

The X-ray diffraction diagram of the composition is shown in FIG. 9.

EXAMPLE 43

A mixture of 220.8 g of a 45% by weight aqueous solution of $Pb(NO_3)_2$ (Pb: 0.30 mole), 65.3 g of a 30% by weight (as $ZrO_2$) aqueous cake of zirconium oxychloride (Zr: 0.159 mole) and 40.9 g of the titanium chloride aqueous solution (Ti: 0.141 mole) were mixed together.

The resultant aqueous slurry was then added to 223 g of a 38.5% by weight aqueous solution of sodium hydroxide at a temperature of 60° C. over 1 hour, followed by the addition of water to the slurry, to provide a slurry of a mixture of the hydroxides of a concentration of 0.5 mole/l in terms of $PbZr_{0.53}Ti_{0.47}O_3$.

The slurry was then subjected to the hydrothermal reaction in the same manner as in Example 1, and to the resultant reaction mixture carbon dioxide was blowed into to adjust the Pb/(Zr+Ti) ratio in the mixture to 1.00. The reaction mixture was then washed with water until no chloride ion was detected, filtered, and dried, to provide a composition which contained $PbZr_{0.53}Ti_{0.47}O_3$ of Pb/(Zr+Ti) ratio of 1.00. The X-ray diffraction diagram of the composition is shown in FIG. 10.

EXAMPLE 44

A mixture of 253.7 g of a 26% by weight aqueous solution of $BaCl_2.2H_2O$ (Ba: 0.27 mole), 14.7 g of a 30% by weight aqueous solution of $CaCl_2.2H_2O$ (Ca: 0.03 mole), 78.4 g of the titanium chloride aqueous solution (Ti: 0.27 mole) and 19.5 g of a 40% by weight $SnCl_4$ aqueous solution (Sn: 0.030 mole) were mixed together.

The resultant aqueous solution was then added to 172 g of a 38.5% by weight aqueous solution of sodium hydroxide at a temperature of 60° C. over 1 hour, followed by the addition of water to the slurry, to provide a slurry of a mixture of the hydroxides of a concentration of 0.5 mole/l in terms of $Ba_{0.9}Ca_{0.1}Ti_{0.9}Sn_{0.1}O_3$.

The slurry was subjected to the hydrothermal reaction in the same manner as in Example 1. The same barium and calcium fixing as in Example 1 provided a composition of the (Ba+Ca)/(Ti+Sn) ratio of 1.00 which contained $Ba_{0.9}Ca_{0.1}Ti_{0.9}Sn_{0.1}O_3$ as a perovskite compound.

EXAMPLE 45

A mixture of 225.5 g of a 26% by weight aqueous solution of $BaCl_2.2H_2O$ (Ba: 0.24 mole), 29.4 g of a 30% by weight aqueous solution of $CaCl_2.2H_2O$ (Ca: 0.060 mole), 69.7 g of the titanium chloride aqueous solution (Ti: 0.24 mole) and 39.1 g of a 40% by weight $SnCl_4$ aqueous solution (Sn: 0.060 mole) were mixed together.

The resultantt aqueous solution was then added to 177 g of a 38.5% by weight aqueous solution of sodium hydroxide at a temperature of 60° C. over 1 hour, followed by the addition of water to provide a slurry. The slurry was then subjected to the hydrothermal reaction in the same manner as in Example 45, and insolubilizing procedures followed with the use of carbon dioxide, to provide a composition substantially composed of $Ba_{0.8}Ca_{0.2}Ti_{0.8}Sn_{0.2}O_3$ in which the (Ba+Ca)/(Ti+Sn) ratio was found 1.00.

EXAMPLE 46

An amount of 281.0 g of a 26% by weight aqueous solution of $BaCl_2.2H_2O$ (Ba: 0.299 mole), 4.69 g of a 5% by weight aqueous solution of $YCl_3$ (Y: 0.0012 mole) and 87.1 g of the titanium chloride aqueous solution (Ti: 0.30 mole) were mixed together under a nitrogen atmosphere.

The resultant aqueous solution was then added to 167 g of a 38.5% by weight aqueous solution of sodium hydroxide at a temperature of 60° C. over 1 hour, followed by the addition of water to the slurry, to provide a slurry of a concentration of 0.5 mole/l in terms of $Ba_{0.996}Y_{0.004}TiO_3$.

The slurry was subjected to the hydrothermal reaction in the same manner as in Example 1. The same barium and yttrium fixing as in Example 1 provided a composition of the (Ba+Y)/Ti ratio of 1.00 which contained $Ba_{0.996}Y_{0.004}TiO_3$ as a perovskite compound.

EXAMPLE 47

An amount of 174.2 g of the titanium hydroxide aqueous solution (Ti: 0.60 mole) was mixed with 1570 ml of water. To the resultant aqueous solution was kept at a temperature of 60° C., and was added thereto 602 ml of a 5% by weight aqueous solution of ammonia over 1 hour, to provide a slurry of titanium hydroxide. The titanium hydroxide was filtered, washed with water until no chloride ion was detected. Under a nitrogen atmosphere an amount of 94.6 g of $Ba(OH)_2.8H_2O$ (Ba: 0.30 mole) was added to the titanium hydroxide, followed by the addition of water to provide a slurry of a mixture of hydroxides of a concentration of 0.5 mole/l in terms of $BaTi_2O_5$.

The slurry was subjected to the hydrothermal reaction in the same manner as in Example 1. The same barium fixing as in Example 1 provided a composition of the Ba/Ti ratio of 0.50 which contained $BaTi_2O_5$.

Properties of the Compositions

EXAMPLE 48

The sinterability of some of the compositions as produced in the preceeding examples and the electric properties of the sintered products of the composition are shown in Table 7.

TABLE 7

| Examples[1] | Calcining Temperatures (°C.) | Densities of Sintered Bodies (g/cm³) | Curie Points (°C.) | Dielectric Constants At Curie Point | Dielectric Constants At Room Temperature | Dielectric Loss Tangents At Room Temperature | Specific Resistance (Ω · cm) |
|---|---|---|---|---|---|---|---|
| 4 | 1200 | 5.55 | 124 | 11918 | 3632 | 1.52 | $8.8 \times 10^{11}$ |
| 16 | 1200 | 5.61 | 122 | 7466 | 3383 | 0.98 | $8.1 \times 10^{12}$ |
| Reference | 1200 | 4.84 | 124 | 3126 | 1252 | 5.25 | $1.6 \times 10^9$ |
| Reference | 1350 | 5.55 | 125 | 6141 | 1347 | 1.93 | $2.6 \times 10^{11}$ |
| 36 | 1200 | 5.60 | 58 | 11243 | 3061 | 0.91 | $5.0 \times 10^{12}$ |
| 39 | 1200 | 5.76 | 46 | 11555 | 8300 | 1.93 | $2.1 \times 10^{11}$ |
| 42 | 1200 | 5.62 | 41 | 11216 | 6198 | 1.63 | $6.5 \times 10^{11}$ |
| 47 | 1200 | 5.01 | — | (+178)[2] | 140 | 0.25 | $8.5 \times 10^{12}$ |

[1]Number of EXAMPLES in which the composition was prepared.
[2]Temperature coefficient (ppm/°C.)

EXAMPLE 49

The composition of Example 4 was mixed with a 8% by weight aqueous solution of polyvinyl alcohol so that the mixture had a solid polyvinyl alcohol in an amount of 0.8% by weight, and the mixture was granulated. The granule was molded under a pressure of 1000 kg/cm$^2$ to green molds, which were then dried, and weighed to determine the density.

The green mold was heated at 400° C. in an electric oven to decompose the polyvinyl alcohol, and then was further heated to a predetermined temperature, followed by calcining for 3 hours to provide a sintered body. The density of the sintered body is shown in FIG. 11. As apparent, the sintered body from the composition of the invention has a superior sinterability to that from the conventional barium titanate produced by the calcining method, which is described in reference example below.

REFERENCE EXAMPLE

High purity barium carbonate and titanium dioxide were mixed together in equimolar amounts, and the mixture was calcined at a temperature of 1200° C. for 2 hours, wet-pulverized in a polyethylene pot having therein agate balls to provide barium titanate of average partcle size of 1.6 $\mu$m. The barium titanate particles were molded to a green mold and sintered in the same manner as in Example 49. The density of the green mold and of the sintered body prepared by sintering the green mold at a predetermined temperature are shown in FIG. 11.

EXAMPLE 50

The compositions produced in some of the preceeding examples and reference example were sintered in the same manner as in Example 49 until the sintered density became constant.

The sintering temperature, density of the sintered body and electric properties of the sintered body are shown in Table 7. For comparison, the composition of reference example was also sintered at 1200° C. at which the sintered body had not yet a constant density.

The sintered body was polished on both surfaces to have a thickness of about 1.0 mm, and was coated with Ag by an ion coater. Then the sintered body was heated in an electric furnace to measure the change in the electrostatic capacity at temperatures ranging from room temperature to 150° C., to find the Curie point and the relative permittivity at the Curie point. The relative permittivity, dielectric loss tangent and specific resistance at room temperature were also measured. The electrostatic capacity, relative permittivity, dielectric loss tangent were measured at 1 Kz with an LF impedance analyzer 4192A (Yokagawa-Hewlett Packard), and the specific resistance was measured at 20° C. based on a current after 1 minute from the application of DC 2 V with a picoammeter 4140B (Yokagawa-Hullet Packard).

As apparent from the results in Table 7, the sintered bodies of barium titanate of Example 4 and 16 are much superior in the sintered density and dielectric properties to the sintered body of Reference Example. The sintered body of Example 39 has Sn as a shifter in amounts of 10 mole % in place of Ti to bring the Curie point to about room temperature. The composition of Example 47 provides a sintered body of BaTi$_2$O$_5$ usable as a temperature compensating capacitor.

EXAMPLE 51

In the same manner as in Example 1, a mixture of titanium hydroxide and barium hydroxide was prepared, and the mixture was subjected to the hydrothermal reaction. The resultant reaction mixture was filtered, washed with water until no barium ion was detected, to provide a reaction product. The filtrate was analyzed by the atomic absorption spectroscopy to find that the Ba conversion was 98.3%.

The reaction product was dispersed in deionized water to form a slurry, and there was added thereto high purity barium carbonate in an amount of 0.017 mole in relation to 1 mole of Ti. The resultant mixture was stirred sufficiently, filtered, washed with water, and dried at a temperature of 110° C..

The resultant composition was found to be 0.08 $\mu$m in particle size and have Ba/Ti ratio of 1.00. The X-ray diffraction diagram of the compound was substantially the same as that of Example 1.

EXAMPLE 52

A powder of a mixture of 3.95 g of boron oxide (B$_2$O$_3$) and 94.20 g of bismuth oxide (Bi$_2$O$_3$) was heated at 700° C. and melted in a platinum crucible. The melted mixture was poured into water to cool rapidly to provide a solid. The solid was powdered in a mortar and then in a ball-mill to provide a B$_2$O$_3$—Bi$_2$O$_3$ glass powder. The composition prepared in Example 1 was mixed with the glass powder in an amount of 5% by weight based on the weight of the composition with the use of a ball-mill.

The sinterability and the electric properties of the mixture measured in the same manner as in Examples 49 and 50 are shown in Table 8.

EXAMPLE 53

A powder of a mixture of 12 g of germanium oxide (GeO$_2$) and 42.7 g of lead oxide (PbO) was heated at 800° C. and melted in a platinum crucible. The melted mixture was poured into water to cool rapidly to provide a solid. The solid was then powdered in a mortar and then in a ball-mill to provide Pb$_5$Ge$_3$O$_{11}$ powder. The composition prepared in Example 1 was mixed with the glass powder in an amount of 10% by weight based on the weight of the composition with the use of a ball-mill.

The sinterability and the electric properties of the mixture measured in the same manner as in Examples 49 and 50 are shown in Table 8.

TABLE 8

| Examples | Calcining Temperatures (°C.) | Times (Hr) | Densities of Sintered Bodies (g/cm$^3$) | Dielectric Loss Tangents | Dielectric Constants At Room Temperature | Maximum | Specific Resistance ($\Omega \cdot$ cm) |
|---|---|---|---|---|---|---|---|
| 52 | 1000 | 1 | 5.60 | 1.4 | 1425 | 1815 | $2.3 \times 10^{11}$ |
| 53 | 900 | 0.5 | 5.49 | 1.1 | 1219 | 3461 | $7.7 \times 10^{12}$ |

What is claimed is:

1. A process for producing a composition which includes a perovskite compound, the process comprising:
   (a) subjecting a mixture of a hydroxide of at least one A group element selected from the group consisting of Mg, Ca, Sr, Ba, Pb and rare earth elements and a hydroxide of at least one B group element selected from the group consisting of Ti, Zr, Hf and Sn, to the hydrothermal reaction in an aqueous reaction medium;
   (b) adding an insolubilizing agent to the resultant reaction mixture to insolubilize water-soluble compounds of the unreacted A group element dissolved in the aqueous medium so as to adjust the ratio of the group A element to the group B element in a resulting composition to a desired A/B ratio; or
   (c) filtering, washing with water and drying the resultant reaction mixture to provide a solid reaction product, dispersing the reaction product in an aqueous medium to form a slurry, adding to the slurry a water-soluble compound of the A group element, and then adding to the slurry an insolubilizing agent to insolubilize the water-soluble compound of the A group element so as to adjust the ratio of the group A element to the group B element in a resulting composition to a desired A/B ratio; and
   (d) filtering, washing and drying the resultant mixture to provide the composition which includes the perovskite compound having the desired A/B ratio.

2. A process for producing a composition which includes a perovskite compound, the process comprising:
   (a) subjecting a mixture of a hydroxide of at least one A group element selected from the group consisting of Mg, Ca, Sr, Ba, Pb and rare earth elements and a hydroxide of at least one B group element selected from the group consisting of Ti, Zr, Hf and Sn, to the hydrothermal reaction in an aqueous reaction medium;
   (b) filtering, washing with water and drying the resultant reaction mixture to provide a solid reaction product, dispersing the reaction product in an aqueous medium to form a slurry, adding to the slurry a water-insoluble compound of the A group element so as to adjust the ratio of the group A element to the group B element in a resulting composition to a desired A/B ratio; and
   (c) filtering, washing and drying the resultant mixture to provide the composition which includes the perovskite compound having the desired A/B ratio.

3. A process for producing a sintered body which is substantially composed of a perovskite compound of desired atomic ratios, the process comprising:
   (a) subjecting a mixture of a hydroxide of at least one A group element selected from the group consisting of Mg, Ca, Sr, Ba, Pb and rare earth elements and a hydroxide of at least one B group element from the group consisting of Ti, Zr, Hf and Sn, to the hydrothermal reaction in an aqueous reaction medium;
   (b) adding an insolubilizing agent to the resultant reaction mixture to insolubilize water-soluble compounds of the unreacted A group element dissolved in the aqueous medium so as to adjust the ratio of the group A element to the group B element in a resulting composition to a desired A/B ratio; or
   (c) filtering, washing with water and drying the resultant reaction mixture to provide a solid reaction product, dispersing the reaction product in an aqueous medium to form a slurry, adding to the slurry a water-soluble compound of the A group element, and then adding to the slurry an insolubilizing agent to insolubilize the water-souble compound of the A group element so as to adjust the ratio of the group A element to the group B element in a resulting composition to a desired A/B ratio; and
   (d) filtering, washing and drying the resultant mixture to provide the composition which includes the perovskite compound having the desired A/B ratio; and then
   (e) sintering the composition at temperatures from about 1100° C. to about 1300° C.

4. A process for producing a sintered body which is substantially composed of a perovskite compound of desired atomic ratios, the process comprising:
   (a) subjecting a mixture of a hydroxide of at least one A group element selected from the group consisting of Mg, Ca, Sr, Ba, Pb and rare earth elements and a hydroxide of at least one B group element selected from the group consisting of Ti, Zr, Hf and Sn, to the hydrothermal reaction in an aqueous reaction medium;
   (b) filtering, washing with water and drying the resultant reaction mixture to provide a solid reaction product, dispersing the reaction product in an aqueous medium to form a slurry, adding to the slurry a water-inoluble compound of the A group element so as to adjust the ratio of the group A element to the group B element in a resulting composition to a desired A/B ratio;
   (c) filtering, washing and drying the resultant mixture to provide the composition which includes the perovskite compound having the desired A/B ratio; and
   (d) sintering the composition at temperatures from about 1100° C. to about 1300° C.

5. The process as claimed in claim 3 wherein the composition is mixed with at least one oxide of an element selected from the group consisting of Bi, B, Pb and W, and the mixture was sintered at temperatures from about 900° C. to about 1100° C.

6. The process as claimed in claim 4 wherein the composition is mixed with at least one oxide of a element selected from the group consisting of Bi, B, Pb and W, and the mixture was sintered at temperatures from about 900° C. to about 1100° C.

* * * * *